(12) United States Patent
Tagaya

(10) Patent No.: US 12,001,124 B2
(45) Date of Patent: Jun. 4, 2024

(54) IMAGE PICKUP APPARATUS

(71) Applicant: CANON KABUSHIKI KAISHA, Tokyo (JP)

(72) Inventor: Akira Tagaya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 17/898,596

(22) Filed: Aug. 30, 2022

(65) Prior Publication Data

US 2023/0072078 A1    Mar. 9, 2023

(30) Foreign Application Priority Data

Sep. 6, 2021 (JP) .................................. 2021-144667

(51) Int. Cl.
| | |
|---|---|
| *G03B 17/02* | (2021.01) |
| *G03B 17/56* | (2021.01) |
| *H04N 23/50* | (2023.01) |
| *H04N 23/52* | (2023.01) |

(52) U.S. Cl.
CPC .............. *G03B 17/02* (2013.01); *G03B 17/56* (2013.01); *H04N 23/52* (2023.01); *G03B 2217/002* (2013.01); *H04N 23/555* (2023.01)

(58) Field of Classification Search
CPC .................................... H05B 3/84; H05B 3/86
See application file for complete search history.

(56) References Cited

U.S. PATENT DOCUMENTS

| | | | | |
|---|---|---|---|---|
| 7,965,336 B2* | 6/2011 | Bingle | ................... | G03B 17/02 |
| | | | | 348/149 |
| 10,365,671 B1* | 7/2019 | Nelson | ................... | G05B 15/02 |
| 11,454,806 B2* | 9/2022 | Ide | ........................ | G03B 17/55 |
| 2006/0283084 A1* | 12/2006 | Johnson | ................... | H05B 3/84 |
| | | | | 49/1 |
| 2019/0227304 A1* | 7/2019 | Eftekhari | ............... | G03B 17/04 |

FOREIGN PATENT DOCUMENTS

JP    09-043723 A    2/1997

* cited by examiner

*Primary Examiner* — Noam Reisner
(74) *Attorney, Agent, or Firm* — Cowan, Liebowitz & Latman, P.C.

(57) ABSTRACT

An image pickup apparatus includes a window portion, an image pickup unit configured to photoelectrically convert an optical image obtained via the window portion, a heating unit, and a movable portion configured to move the heating unit to a first position and a second position. At the first position, the heating unit does not contact the window portion. At the second position, the heating unit contacts the window portion.

11 Claims, 2 Drawing Sheets

IMAGE PICKUP APPARATUS

BACKGROUND

Technical Field

The disclosure relates to an image pickup apparatus.

Description of the Related Art

Network cameras are expected to be installed in various environments such as an environment outside a vehicle and an environment in cold regions. An imaging range of a camera window of the network camera may be blocked by (dew) condensation, snow adhesion, freezing, etc., and a desired image may not be recorded. In order to solve this problem, a network camera including a heater (heating unit) for heating the camera window has been known. The heater keeps the camera window hot with a large power amount to melt snow and ice even in freezing environments. However, in order to prevent condensation, the power amount to make the camera window hot may not be necessary.

Japanese Patent Laid-Open No. ("JP") 9-43723 discloses a camera housing that houses a television camera, and includes a demisting window as an imaging window by arranging window members at least doubly at predetermined intervals and by hermetically sealing a space between the window members to form a thermal insulation layer.

In the camera housing disclosed in JP 9-43723, the fixed thermal insulation layer is disposed between the heater and the camera window. In order to heat the camera window with the heater, it is necessary to heat the camera window through the thermal insulation layer. To prevent condensation as well as melting snow and ice, the camera window needs to be kept hot. However, the thermal insulation layer has such low thermal conductivity that it consumes a large power amount to heat the camera window at a high temperature.

SUMMARY

The disclosure provides an image pickup apparatus that can improve the heating efficiency of a heating unit and consumes less power.

An image pickup apparatus according to one aspect of the disclosure includes a window portion, an image pickup unit configured to photoelectrically convert an optical image obtained via the window portion, a heating unit, and a movable portion configured to move the heating unit to a first position and a second position. At the first position, the heating unit does not contact the window portion. At the second position, the heating unit contacts the window portion.

Further features of the disclosure will become apparent from the following description of exemplary embodiments with reference to the attached drawings.

DESCRIPTION OF THE EMBODIMENTS

Referring now to the accompanying drawings, a detailed description will be given of embodiments according to the disclosure. In this embodiment, a network camera will be described as an example of the image pickup apparatus, but the disclosure is not limited to this example and is applicable to another image pickup apparatus.

Figure 1:
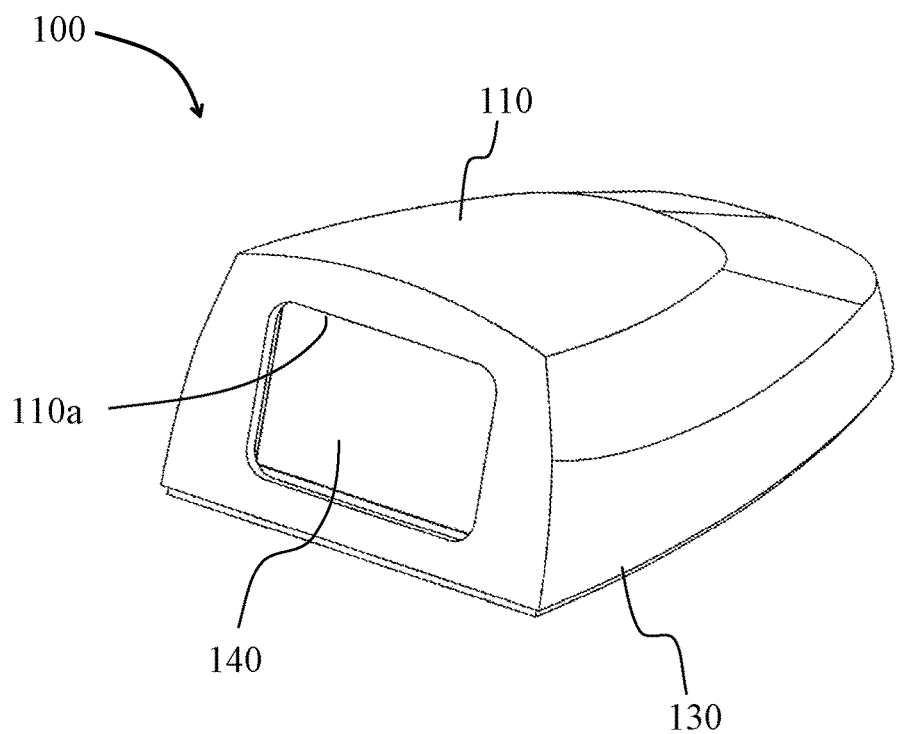
FIG. 1 is an external view of an image pickup apparatus according to this embodiment.

Referring now to FIG. 1, a description will now be given of an external configuration of an image pickup apparatus (network camera) 100 according to this embodiment. FIG. 1 is an external view of the image pickup apparatus 100. The image pickup apparatus 100 can capture and record an image. The image pickup apparatus 100 includes a housing that includes a top cover 110 and a bottom cover 130. The top cover 110 and the bottom cover 130 can be manufactured by resin molding such as metal die casting or polycarbonate, respectively. The bottom cover 130 has an installation hole, and is fixed to a vehicle or the like with screws or the like. The top cover 110 and the bottom cover 130 are fastened to each other with screws or the like.

A camera window (window portion) 140 is disposed so as to close an opening 110a as an imaging range of the top cover 110, and has a role of protecting a lens unit (optical system) and other components housed in the housing from impact and dust. The camera window 140 is fixed to the top cover 110 by adhesion or the like. Since an image is captured through the camera window 140, the camera window 140 is treated as an optical element and its transparency and dimensional accuracy are important. The camera window 140 is made, for example, of glass or transparent polycarbonate.

Figure 2:
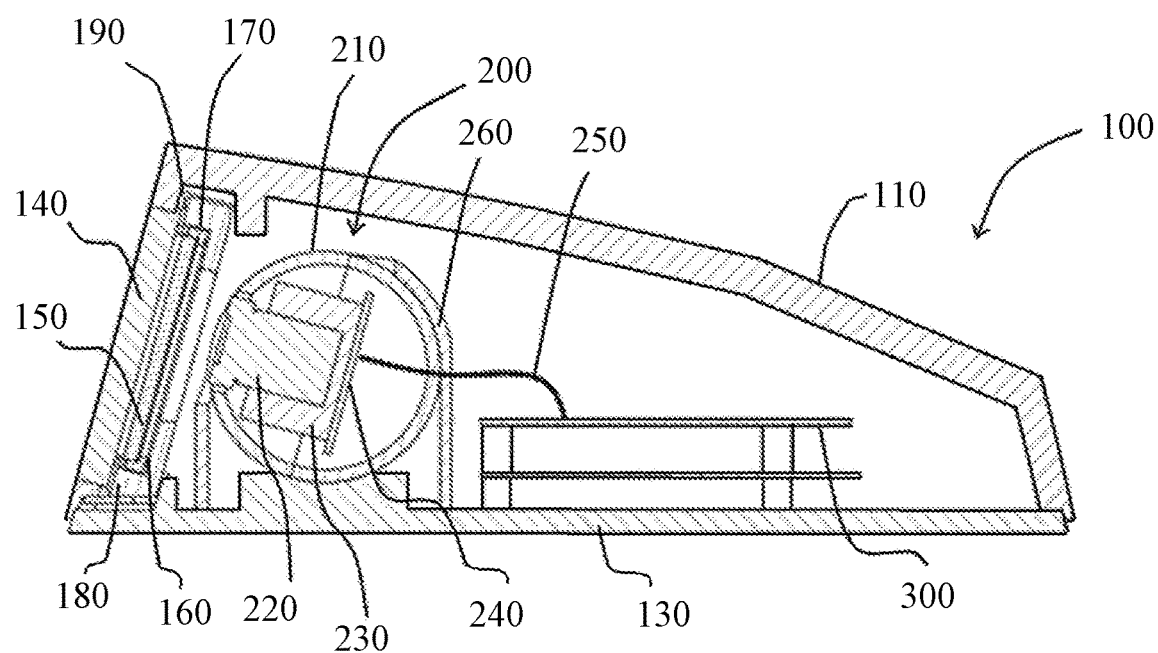
FIG. 2 is a sectional view of an image pickup apparatus according to this embodiment.

Referring now to FIG. 2, a description will be given of an internal configuration of the image pickup apparatus 100. FIG. 2 is a sectional view of the image pickup apparatus 100. The housing of the image pickup apparatus 100 houses, in order from the outside of the housing, the camera window 140, a heater (heating unit) 150, a first holder (first holding unit) 170, a movable member (movable portion) 160, and a second holder (second holding unit) 180.

The heater 150 is made, for example, by combining a transparent plate with a heating member, and the entire heater 150 is heated by energizing the heating member. Examples of the transparent plate include glass and polycarbonate resin. Examples of the heating member include a flexible printed circuit (FPC) heater or rubber heater adhered to the outside of the imaging range of the transparent plate surface, or a heating wire pattern that is hard to see and provided to the rear surface of the transparent plate so as to heat the entire transparent plate by energizing the pattern. The heater 150 is electrically connected to a control board 300, which will be described below, by using an FPC or a wire. The first holder 170 holds the heater 150 while covering edges of the heater 150. The second holder 180 movably holds the first holder 170. The second holder 180 is fixed to the housing by screws or fixing members. The first holder 170 and the second holder 180 are made by molding a resin such as polycarbonate or polybutylene terephthalate (PBT).

An image pickup unit 200 having an approximately spherical shape is disposed inside the housing. The image pickup unit 200 includes a lens unit (optical system) 220, a lens holder 230, an image pickup substrate 240 provided with an image sensor, and a lens cover 210, and photoelectrically converts an optical image obtained through the camera window 140. The lens unit 220 is screwed and held by the lens holder 230, and its position is adjustable in the optical axis direction during focusing. The image pickup substrate 240 is fixed to the lens holder 230 by adhesion or the like. The lens holder 230 is held by and fixed to the lens cover 210.

An opening portion for imaging is formed in front of the lens cover 210. A hole for passing a wire 250 or the like is formed at the back of the lens cover 210. The lens cover 210 can be manufactured, for example, by metal die-casting or resin molding such as polycarbonate. The image pickup unit 200 is held so as to be covered with a cover retaining member 260 and the bottom cover 130, and can be tilted and rotated. The cover retaining member 260 continuously opens from the horizontal position as the imaging range to the vertical position. This structure restricts the range of the tilt operation. The cover retaining member 260 is fixed so that it can be panned, and the lens unit 220 can be panned. The cover retaining member 260 can be manufactured, for example, by resin molding such as polycarbonate.

The control board (control unit) 300 is housed inside the housing. The control board 300 has a control function of the entire image pickup apparatus 100 such as heater control, power supply, camera control, and network connection. The control board 300 and the image pickup substrate 240 are electrically connected by the wire 250 or the like. A temperature sensor (detector) is mounted on the control board 300 or the image pickup substrate 240, and the control board 300 controls the heater 150 based on the temperature detected by the temperature sensor. The image pickup substrate 240 converts light received through the camera window 140 and the lens unit 220 into an electric signal (image data). The electric signal converted by the image pickup substrate 240 is transmitted to the control board 300. The control board 300 records the received image data or distributes it on the network.

Figure 3:
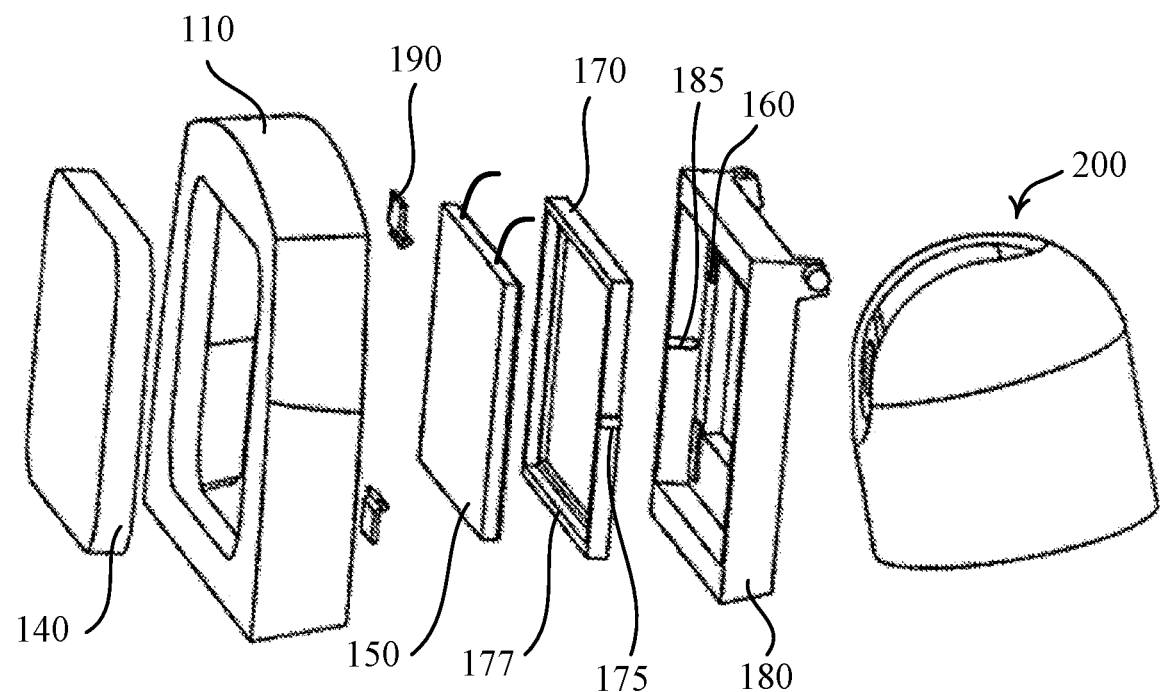
FIG. 3 is an exploded view of principal part of the image pickup apparatus according to this embodiment.

Referring now to FIG. 3, a detailed description will be given of a peripheral structure of the heater 150. FIG. 3 is an exploded view of the principal part (periphery of the heater 150) of the image pickup apparatus 100. The top cover 110, the first holder 170, and the second holder 180 are open in the imaging range of the image pickup unit 200. The heater 150 is fixed to the first holder 170 with double-sided tape or adhesive and integrated with the first holder 170.

The first holder 170 includes an edge portion (frame portion) 177 that covers the edge of the heater 150. The edge portion 177 (length in the horizontal direction in FIG. 3, that is, direction perpendicular to a surface of the camera window 140) is lower in height than the heater 150 (thickness in the horizontal direction in FIG. 3). Thus, while the first holder 170 holds the heater 150, the heater 150 protrudes from the edge portion 177 (protrudes to the left side in FIG. 3).

A first guide portion 175 is formed on each side of the first holder 170. A second guide portion 185 is formed on each side of the second holder 180. The first guide portion 175 has a protrusion shape and is engaged with the slit shape of the second guide portion 185. As a result, the direction in which the first holder 170 and the heater 150 move is restricted to a direction perpendicular to the plane of the camera window 140 (horizontal direction in FIG. 3). Due to this configuration, the heater 150 and the camera window 140 are parallel to each other, and the camera window 140 and the heater 150 can uniformly contact each other. As a result, the camera window 140 can be uniformly heated and the entire imaging range can be prevented from condensing and freezing.

In this embodiment, the first guide portion 175 and the second guide portion 185 are disposed on each short side portion of each holder frame, but the disclosure is not limited to this example, and they may be disposed on each longitudinal side portion or at the four corners of each holder frame. In order to restrict the position and the rotation, the first guide portions 175 and the second guide portions 185 may be provided at least two locations. Pressing members (pressing portions) 190 are held by the top cover 110 and disposed so as to press the first holder 170 toward the inside of the housing. This configuration prevents the first holder 170 from vibrating in the second holder 180 due to vibration. The pressing member 190 is made of an elastic member such as silicon rubber or a leaf spring.

A description will now be given of an electric heating method (heating method) of the heater 150. The control board 300 supplies a current to the heater 150 based on information from a temperature detecting unit such as the temperature sensor. Since the heater 150 has electrical resistance, it generates heat as a whole due to the current received from the control board 300. The control board 300 has a plurality of target values for the heating temperature of the heater 150. For example, in a case where the outside air temperature is below the freezing point, the time for supplying the current to the heater 150 is extended so that the heater 150 has a temperature at which ice and snow can be melted. On the other hand, in a case where condensation may occur although it is not below the freezing point, the heating of the heater 150 is weakened by shortening the time for supplying the current to the heater 150. In a case where heating is not required, no current is supplied. The heat of the heater 150 generated by the current supply from the control board 300 is transmitted to the camera window 140. As a result, the entire camera window 140 is warmed up, and the imaging range can be prevented from suffering from condensation, snow adhesion, and freezing.

In order to improve the heating efficiency of the heater 150, the first holder 170 and the second holder 180 may be made of a heat-resistant resin having a low thermal conductivity. Thereby, the heat of the heater 150 can be concentrated on the camera window 140 without transmitting to the housing. In order to make uniform the temperature distribution of the camera window 140, the material of the camera window 140 may use a glass material having a high thermal conductivity. In order to withstand temperature changes and external impacts, tempered glass having a thickness of about 5 mm may be employed.

The movable member 160 is disposed between the first holder 170 and the second holder 180, and is fixed to the bottom frame surface of the second holder 180 by adhesion or the like. The movable member 160 is made of bimetal or the like and deformable according to temperature. Bimetal includes two metal plates having different coefficients of thermal expansion bonded together, and is generally used for thermometers, thermostats, and the like. Since the movable member 160 is disposed below the heating member of the heater 150, the heat from the heater 150 can be easily transferred. In a case where the temperature of the heater 150 becomes high (in a case where the temperature of the heater 150 rises), heat is transferred to the movable member 160, and the movable member 160 is deformed so as to warp. As a result, the movable member 160 presses the first holder 170 in the direction approaching the camera window 140 (to the left in FIG. 3). The pressing force of the movable member 160 is set to be larger than the reaction force of the pressing member 190. The movable member 160 may include a plurality of elements and be uniformly disposed near each guide portion and within the frame of each holder.

Figure 4A:
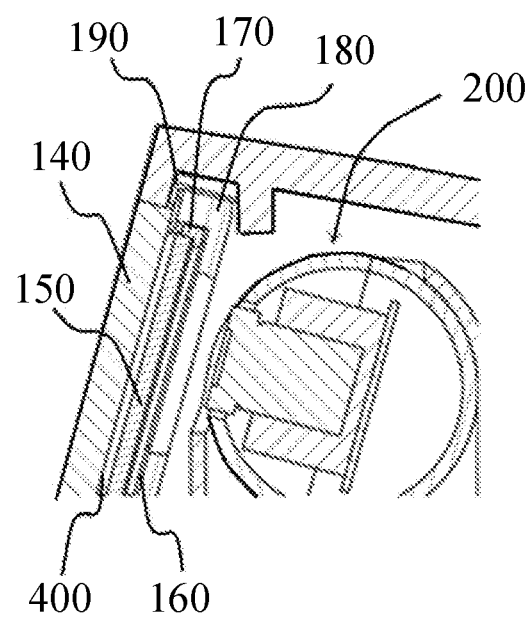
FIGS. 4A and 4B explain a heater in this embodiment.
Figure 4B:
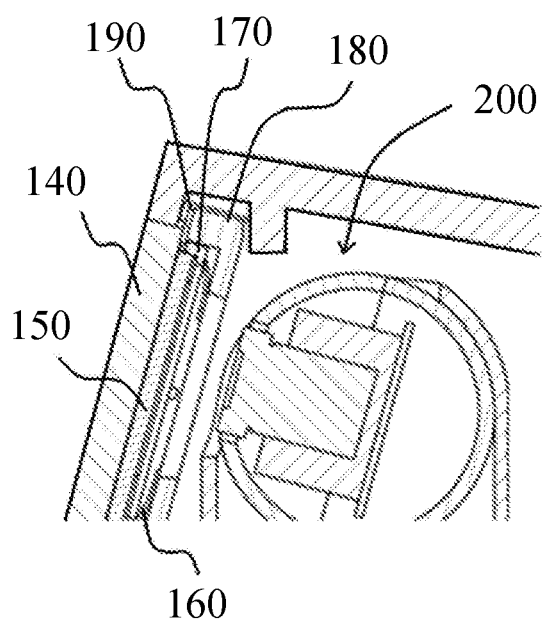

Referring now to FIGS. 4A and 4B, a description will be given of the movement of the heater 150 in the image pickup apparatus 100. FIGS. 4A and 4B explain the movement of the heater 150. FIG. 4A illustrates a state in which there is a space 400 between the camera window 140 and the heater 150, that is, a state in which the heater 150 does not contact the camera window 140 (first position). This state assumes a mode for preventing condensation, the time for supplying the current to the heater 150 is short, and the temperature of the heater 150 is low (first temperature). Thus, the deformation of the movable member 160 is small, and the movable member 160 is close to a flat plate shape. The pressing amount of the movable member 160 against the first holder 170 is also small. The pressing member 190 presses the first holder 170 and the heater 150 with a weak force toward the inside of the housing. As a result, the heated space 400 is formed between the heater 150 and the camera window 140. The space 400 acts as a thermal insulation layer.

A description will now be given of the occurrence principle of condensation. In a case where the outside air is cold, the camera window 140 is cooled by the outside air. At that time, when the image pickup apparatus 100 is powered on, the inside of the housing becomes warmer than the outside air temperature due to the heats of the image pickup substrate 240 and the control board 300. The water absorbed by the substrate and components is released into the housing as water vapor. Since the camera window 140 is cooled by the outside air, the air near the inside of the camera window 140 is locally cooled. As a result, the water vapor inside the housing locally exceeds the saturated water vapor amount and solidifies, causing condensation.

In the state of FIG. 4A, the heated space 400, that is, the thermal insulation layer is formed inside the camera window 140. Since the volume of this thermal insulation layer is small, the contained water vapor amount is also much smaller than that the inside of the housing. Since it is heated by the heater 150, no condensation occurs inside the thermal insulation layer. Since the air amount that needs to be heated by the heater 150 is also small, the electric power amount to be supplied to the heater 150 may be small. Since the thermal conductivity of air is low, the thermal insulation layer has a function of preventing the temperature of the outside air from transmitting to the inside of the housing. This configuration prevents the heater 150 and the inside of the housing from being locally cooled by the outside air through the camera window 140.

FIG. 4B illustrates a state (second position) in which the heater 150 contacts the camera window 140. This state assumes a mode in which ice and snow are removed in freezing environments, and the time for supplying the current to the heater 150 is long and the temperature of the heater 150 is high (second temperature higher than the first temperature). Thus, the movable member 160 is greatly deformed to be warped in a bow shape. Therefore, the pressing amount against the first holder 170 is large. The pressing member 190 presses the first holder 170 into the inside of the housing with a weak force. Since the pressing force of the movable member 160 is stronger (the pressing force of the pressing member 190 is weaker than the pressing force of the movable member 160), the first holder 170 and the heater 150 move to the side of the camera window 140. The heater 150 and the camera window 140 come into contact with each other. In order to remove ice and snow, it is necessary to raise the outside temperature of the housing of the camera window 140 to 0° C. or higher. In the state of FIG. 4B, the temperature of the heater 150 is high, and the heater 150 and the camera window 140 contact each other, so that the electric heating efficiency is high. Therefore, even if the outside air temperature is below the freezing point, it is possible to sufficiently raise the temperature of the outside of the camera window 140 and to prevent ice and snow from adhering.

As described above, the movable member 160 can move the heater 150 to the first position and the second position. At the first position, the heater 150 does not contact the camera window 140, and at the second position, the heater 150 contacts the camera window 140. The movable member 160 may move the heater 150 to the first position in the case where the temperature is the first temperature, and the heater 150 may move to the second position in the case where the temperature is higher than the first temperature.

In this embodiment, the heater 150 is automatically moved by the movable member 160 according to the temperature, so that the camera window 140 is efficiently heated and power saving can be achieved both during condensation prevention and during ice or snow removal. Therefore, this embodiment can provide an image pickup apparatus that consumes less power by improving the heating efficiency of the heating unit.

In this embodiment, the housing includes two components, or the top cover 110 and the bottom cover 130, but may include three or more components. In this embodiment, the top cover 110 and the bottom cover 130 may be fixed by using claw engagement or adhesion. In this embodiment, the control board 300 and the image pickup substrate 240 may be electrically connected with an FPC, a flat cable, a thin coaxial cable, or a relay board. In this embodiment, the heater 150 and the control board 300 may be connected with a relay board. In this embodiment, the heater 150 may use a film heater having a transparent imaging range. In this embodiment, the movable member 160 may be made of a member that is deformable by energization, such as a motor, a magnet, and an artificial nerve. In this embodiment, the camera window 140 may use acrylic resin, sapphire glass, or the like. In this embodiment, the first guide portion 175 and the second guide portion 185 may be formed by using a pin shape or an outer shape engagement instead of the protrusion and the slit. In this embodiment, the pressing member 190 may be omitted by fixing both ends of the movable member 160 to the first holder 170 and the second holder 180.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-144667, filed on Sep. 6, 2021, which is hereby incorporated by reference herein in its entirety.

What is claimed is:

1. An image pickup apparatus comprising:
a window portion;
an image pickup unit configured to photoelectrically convert an optical image obtained via the window portion;
a heating unit; and
a movable portion configured to move the heating unit to a first position and a second position,
wherein at the first position, the heating unit does not contact the window portion, and wherein at the second position, the heating unit contacts the window portion.

2. The image pickup apparatus according to claim 1, wherein the movable portion moves the heating unit to the first position in a case where temperature is a first temperature, and wherein the movable portion moves the heating unit to the second position in a case where the temperature is a second temperature higher than the first temperature.

3. The image pickup apparatus according to claim 1, further comprising:

a housing;

a first holding unit configured to hold the heating unit; and a second holding unit held by the housing and configured to movably hold the first holding unit, wherein the movable portion is disposed between the first holding unit and the second holding unit, and wherein the heating unit is movable to the first position and the second position by moving the first holding unit by the movable portion.

4. The image pickup apparatus according to claim 3, wherein at the first position, a space is formed between the heating unit and the window portion, and wherein at the second position, the heating unit is pressed against the window portion by the movable portion.

5. The image pickup apparatus according to claim 3, wherein the first holding unit and the second holding unit are open in an imaging range of the image pickup unit.

6. The image pickup apparatus according to claim 3, wherein the first holding unit includes an edge portion covering an edge of the heating unit, and wherein the edge portion is lower than the heating unit in a direction perpendicular to a plane of the window portion.

7. The image pickup apparatus according to claim 3, wherein the moving portion is deformable according to temperature, and wherein in a case where the temperature of the heating unit rises, the movable portion moves the first holding unit so that the first holding unit approaches the window portion.

8. The image pickup apparatus according to claim 3, wherein the first holding unit includes a first guide portion, wherein the second holding unit includes a second guide portion engaged with the first guide portion, and wherein the first holding unit is movable in a direction perpendicular to a plane of the window portion relative to the second holding unit.

9. The image pickup apparatus according to claim 3, further comprising a pressing unit disposed between the first holding unit and the housing.

10. The image pickup apparatus according to claim 9, wherein a pressing force of the pressing unit is weaker than that of the movable portion.

11. The image pickup apparatus according to claim 3, wherein the window portion is fixed to the housing so as to close an opening of the housing.

\* \* \* \* \*